(12) United States Patent
Caturla et al.

(10) Patent No.: US 7,862,112 B2
(45) Date of Patent: Jan. 4, 2011

(54) SUPPORT DEVICE TO MOUNT AGAINST THE REAR OF THE BACK OF A COCKPIT SEAT

(75) Inventors: Jean-Pascal Caturla, Montaigut (FR); Gérard Montariol, Portet sur Garonne (FR); Mark Van Der Zwalmen, Toulouse (FR); Philippe Blanc-Tailleur, Toulouse (FR); Vincent Ouverlot, Leguevin (FR)

(73) Assignee: Airbus France, Toulouse (FR)

( * ) Notice: Subject to any disclaimer, the term of this patent is extended or adjusted under 35 U.S.C. 154(b) by 153 days.

(21) Appl. No.: 12/058,017

(22) Filed: Mar. 28, 2008

(65) Prior Publication Data
US 2009/0008969 A1 Jan. 8, 2009

(30) Foreign Application Priority Data
Mar. 30, 2007 (FR) .................................. 07 54161

(51) Int. Cl.
*A47B 23/00* (2006.01)
(52) U.S. Cl. .................................. 297/163; 297/188.06
(58) Field of Classification Search ................ 297/163, 297/169, 173, 188.06, 188.2, 167, 188.04, 297/188.03, 188.05
See application file for complete search history.

(56) References Cited

U.S. PATENT DOCUMENTS

| 1,525,928 | A | * | 2/1925 | Fitch | .......................... 297/163 |
|---|---|---|---|---|---|
| 1,582,380 | A | * | 4/1926 | Carpenter et al. | ........... 297/163 |
| 3,019,050 | A | * | 1/1962 | Spielman | .................. 297/217.3 |
| 4,792,183 | A | * | 12/1988 | Townsend, III | .............. 297/163 |
| 5,269,229 | A | * | 12/1993 | Akapatangkul | ............... 108/44 |
| 5,275,466 | A | * | 1/1994 | Rentchler, Jr. | ......... 297/411.25 |
| 5,359,349 | A | | 10/1994 | Jambor et al. | |
| 5,370,060 | A | * | 12/1994 | Wang | .......................... 108/44 |
| 5,984,347 | A | | 11/1999 | Blanc-Rosset | |
| 6,135,548 | A | * | 10/2000 | McGuire | ..................... 297/163 |
| 6,279,800 | B1 | | 8/2001 | Lee | |
| 6,607,241 | B2 | * | 8/2003 | Johnston | ................ 297/188.06 |
| 6,830,292 | B1 | | 12/2004 | Yoda | |
| 6,957,854 | B1 | * | 10/2005 | Seastrom | ............... 297/188.04 |
| 2006/0169730 | A1 | * | 8/2006 | Morrison | ..................... 224/275 |

FOREIGN PATENT DOCUMENTS

| DE | 40 01 448 C1 | 7/1991 |
|---|---|---|
| DE | 94 17 328 U1 | 12/1994 |
| FR | 2 737 447 A | 2/1997 |
| GB | 2 239 639 A | 7/1991 |

\* cited by examiner

*Primary Examiner*—Joseph Edell
(74) *Attorney, Agent, or Firm*—Oblon, Spivak, McClelland, Maier & Neustadt, L.L.P.

(57) ABSTRACT

The invention relates to a support device suitable for being installed in an arrangement referred to as "mounted" against the rear of a back of a seat comprising a headrest. The headrest is held at the top of the back by at least one upright. The support device includes a framework suitable for being positioned and supported on the top of the back, a clamp movable in relation to the framework, and at least one reversible fastener making it possible to fasten the clamp to the framework so as to immobilize the framework in relation to the upright.

9 Claims, 5 Drawing Sheets

Figure 1:
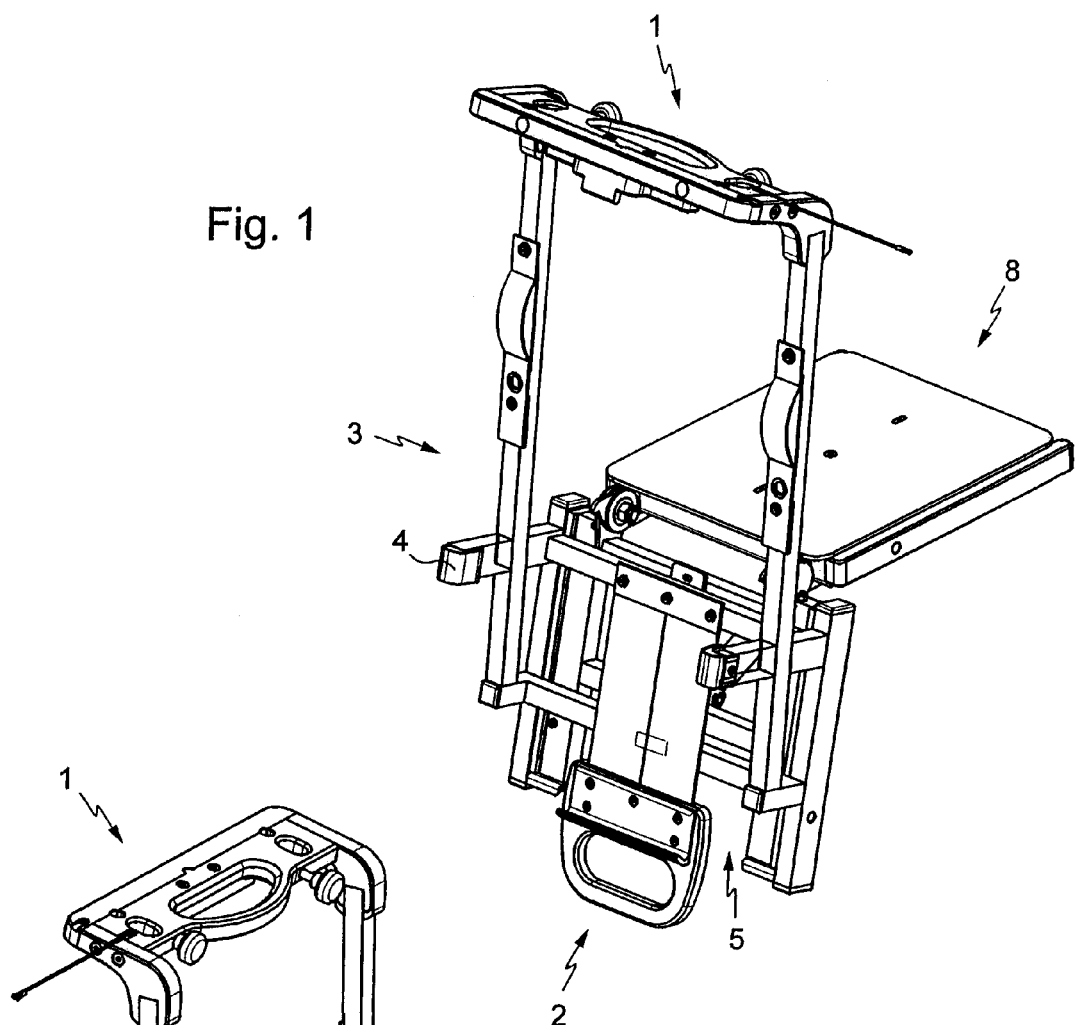

Fig. 3
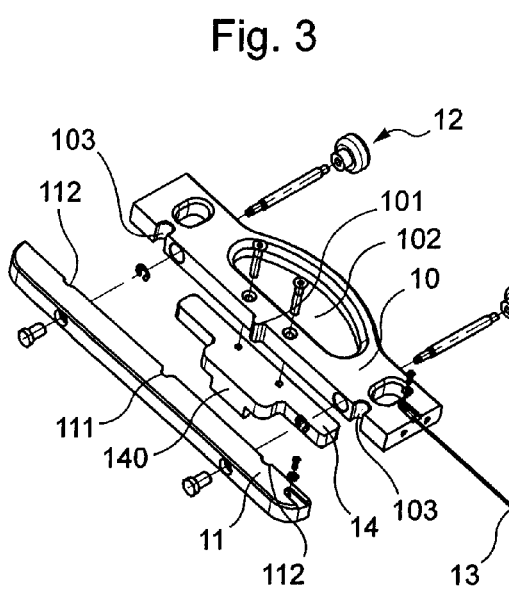
Fig. 4
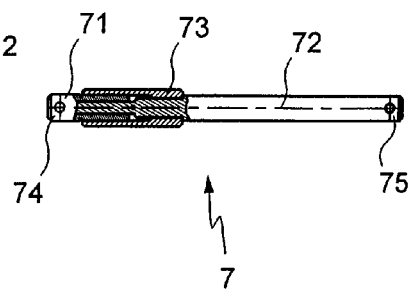
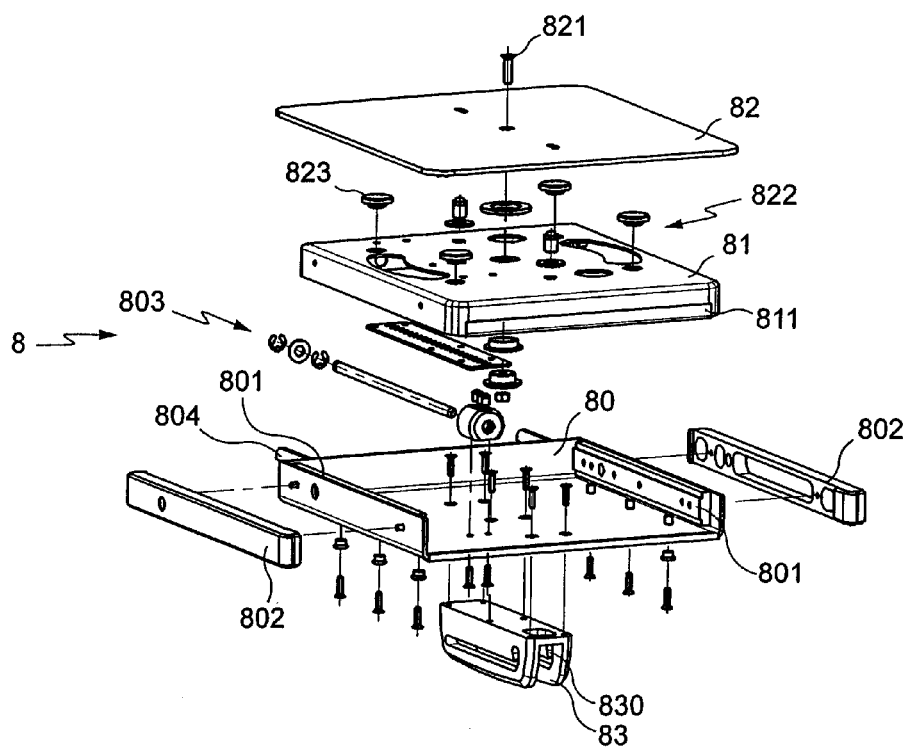
Fig. 5

SUPPORT DEVICE TO MOUNT AGAINST THE REAR OF THE BACK OF A COCKPIT SEAT

This invention relates to a support device to mount against the rear of the back of a seat, in particular an aircraft cockpit seat.

It may involve, for example, the seat for the pilot or the copilot.

The support device possibly comprising a tray or shelf system suitable for holding a portable computer.

This invention also relates to a seat equipped with such a support device and an aircraft equipped with such a support device.

Shelves for passengers seated in the passenger cabin of an aircraft already are known. These shelves are fold-out and are built into the back of the seats.

On the contrary, it will be noted that no shelf exists for an operator seated in the cockpit. In particular, no shelf that is arranged on the back of the seat for the pilot or the seat for the copilot and that is intended for an operator seated in third-man position is known. An operator seated in third-man position often is at an angle in relation to the seat for the pilot or the copilot.

Such a shelf may have many applications. By providing a writing surface, it may be used for drawing up documents. It also may make it possible for an operator seated in third-man position to use a portable computer, by providing him with a surface for opening out such a computer.

Such a shelf on the back of a cockpit seat of an aircraft preferably should meet various restrictions, and preferentially possess certain functionalities.

In general, the support device for such a shelf preferably should be able to be fastened to the seat for the pilot or the copilot of existing airplanes, without the components of the cockpit being modified.

It is desired that the device does not risk hindering the maneuvers of the pilots, or does not risk hindering access to the safety equipment. Its space requirement preferably should be minimal.

Preferably neither should it be capable of damaging the seats or the cockpit.

It also is desired that the shelf and its support device have a moderate weight, and be easy for a sole individual to transport from the outside of the airplane to the inside of the cockpit.

If possible, the ergonomics of mounting should be meticulous: mounting and dismantling of such a shelf should be simple, in order that, for example, a sole operator easily can take the shelf out of a storage space (a bin for example) and mount it on the back of the seat for the pilot or the back of the seat for the copilot.

The installation time for the support device and for the shelf should be short (less than 2 min.). It is desired that the installation and dismantling require the participation of only one individual, and be able to be accomplished with one hand and without a tool.

The device preferentially should be stable throughout all flight phases, including during episodes of turbulence. For example, it should withstand operational conditions ranging up to 2-g accelerations upward, downward or in a lateral direction.

For such purpose, this invention proposes a support device suitable for being installed in an arrangement referred to as "mounted" against the rear of a back of a seat comprising a headrest, the said headrest being held at the top of the said back by at least one upright, the said support device comprising a framework suitable for being positioned supported on the top of the said back, a clamp movable in relation to the said framework, and at least one reversible fastening means making it possible to fasten the said clamp to the said framework so as to immobilize the said framework in relation to the said upright.

The device according to the invention therefore may be installed against the rear of a back of a seat.

To begin with, the framework may be positioned supported on the top of the back, so that it is stable or sufficiently stable in this position for several moments. That requires that the framework be suitable at the top of a back having an area providing the possibility of positioning the framework supported thereon.

Subsequently, the clamp and the fastening means make it possible for the user to immobilize the framework with regard to the seat. This operation is facilitated by the fact that the framework is stable for a sufficient period of time to allow the user to position the clamp and to utilize the fastening means to immobilize the framework with regard to the seat.

As the fastening is reversible, the support device may be dismantled following use.

The invention may be applied to cockpit seats, but also to other seats, such as those in railroad cars or buses, for example.

Preferentially the whole made up of the said framework and the said clamp comprises at least one slot suitable for accommodating the said upright so that the fastening of the said clamp to the said framework brings about immobilization of the said framework (as well as of the clamp) with regard to the said upright.

The complementary nature of the forms makes possible a simple, effective, jolt-resistant immobilization.

Preferentially the said framework comprises a means for anchoring in a cushion of the front face of the top of the said back.

This anchoring makes it possible to ensure that at the time of the mounting process, the framework, which to begin with is positioned on the top of the back, is really stable in this position, until the operator subsequently immobilizes the framework with regard to the upright.

Preferentially, the clamp comprises a fail-safe mechanism making it possible to ensure positioning thereof on the framework at the time of fastening.

That allows the user to position the clamp on the clamp support rapidly and easily, whatever the conditions of use may be (jolts, poor accessibility . . . ).

Preferentially, the said reversible fastening means comprises at least one cage nut and at least one captive screw.

Preferentially, the said clamp is connected to the said framework by a flexible cable, which makes it possible to avoid the risks of mislaying of the clamp during periods of storage and transport of the device.

Preferentially, the device further comprises a fastening system making it possible to hook the said framework to the bottom of the said seat, which enables the overall positioning of the support device to be made rigid in relation to the seat.

Preferentially, this fastening system comprises an elastic strap connecting the said framework to a hook suitable for hooking the bottom of the said seat.

Preferentially, the device further comprises a protective stop making it possible to position the support device supported on the back of the seat while protecting the surface of the latter.

The device according to the invention may meet other restrictions, and possess other functionalities, independent or otherwise of those that have just been mentioned. Some of them are original in themselves.

The shelf preferentially should be able to be folded back against the seat in order to facilitate movement in the cockpit, or even to allow entry into the cockpit.

Preferentially, the operator should be able to perform adjustments in order to access the shelf comfortably from a third-man seat, whatever his stature may be.

Moreover, the device should permit compensation for the degree of tilt of the seat in order to keep the shelf horizontal or at the desired tilt.

Likewise, the device preferentially should allow adjustment of the height of the shelf to compensate, for example, for the height of the seat.

It is desired that the device also make it possible to position around a vertical axis so as to permit, for example, positioning of the screen of a portable computer toward the seat for the third man in the cockpit.

Likewise, it is desired that the device permit translation of the shelf in order to improve the visual comfort of the operator.

To this end, the invention proposes a support device suitable for being installed in an arrangement mounted against the rear of a back of a seat, comprising a framework and also a lifter in translation in relation to the framework along a direction barely inclined (for example less than 10, 20, 30 or 40°) in relation to the vertical in the mounted arrangement.

That makes it possible for the user of the support device to adjust the device to his liking, whatever may be the use that he makes of the device, his stature, and whatever may be the height adjustment of the seat on which the device is fastened.

Preferentially, the device comprises a tray system capable of being positioned at least in an opened-out position in which it provides the user with a flat surface and is suitable for serving as a support surface.

Preferentially, the tray system is movable in rotation in relation to a support for the tray system around an axis of rotation of the horizontal tray system in the mounted arrangement of the device, between at least the said opened-out position and a position folded back against the said back on the headrest side.

The support for the tray system may be a component of the framework or a component integral with the framework, but also may be a lifter such as was mentioned above.

Preferentially, the angle between the tray system and the support device in the said opened-out position may be adjusted by a user by means of action on a rod of adjustable length, with axes of articulation parallel to the said axis of rotation of the tray system and connected at a first end to a support for the tray system and at a second end to the tray system.

That affords the advantage that the user may adjust the device to his liking, in particular to bring the flat surface of the tray system into horizontal position, irrespective of the tilt of the back of the seat to which the support device is fastened.

Preferentially, the rod furthermore is mounted at its second end in translation in relation to the tray system along a direction perpendicular to the said axis of rotation of the tray system, for example through the medium of a rod guide rail.

The rail provides a range of translation extending at least between a position of the second end of the rod in the folded-back position of the tray system and a position of the second end in the opened-out position of the tray system.

That makes it possible to ensure the complete folding back of the tray system against the back on the headrest side without taking down the rod since its second end can, from its position corresponding to the opened-out position of the tray system, follow a translatory movement perpendicular to the axis of rotation of the tray system up to its position corresponding to the folded-back position of the tray system.

Preferentially, the device comprises a lifter movable in translation in relation to the framework along a direction barely inclined in relation to the vertical in the mounted arrangement of the support device, and the tray system is fixed in translation in relation to the said lifter, and the rod is connected at its first end to the said lifter.

Preferentially the said tray system comprises a sliding tray which, in the mounted arrangement of the support device and in the opened-out position of the tray system, is movable in translation in relation to a support for the tray system along a horizontal or more or less horizontal direction (according to the adjustment of the rod), between a position close to the back and a position away from the back.

Preferentially, the said tray system comprises a shelf movable in rotation in relation to a support for the tray system around a vertical axis or more or less vertical axis (according to the adjustment of the rod) in the mounted arrangement of the support device and in the opened-out position of the tray system.

The axis is perpendicular to the flat surface of the tray system, and the flat support surface provided for the user is the surface of the shelf.

Preferentially, the said tray system is, in the said opened-out position, suitable for holding a portable computer.

Preferentially, the said seat is an aircraft seat, or even an aircraft cockpit seat.

The invention also proposes an aircraft pilot's seat equipped with a support device such as described, as well as an aircraft sub-assembly or an aircraft equipped with a support device such as described.

Figure 2:
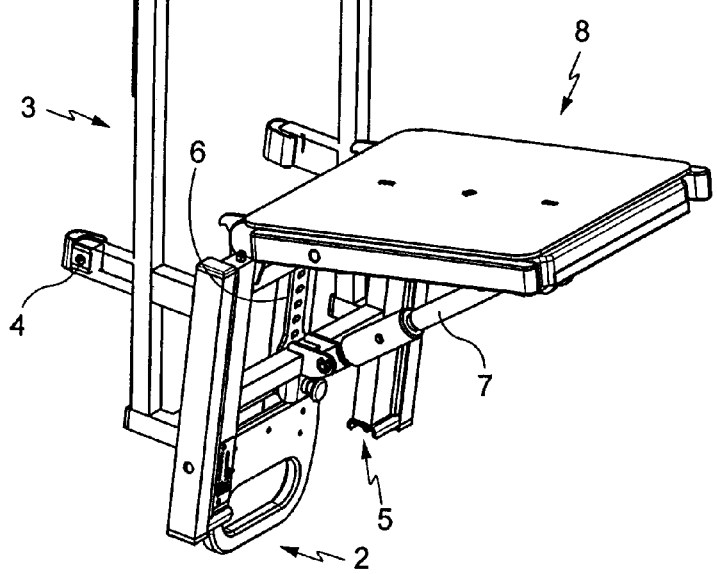
Figure 7:
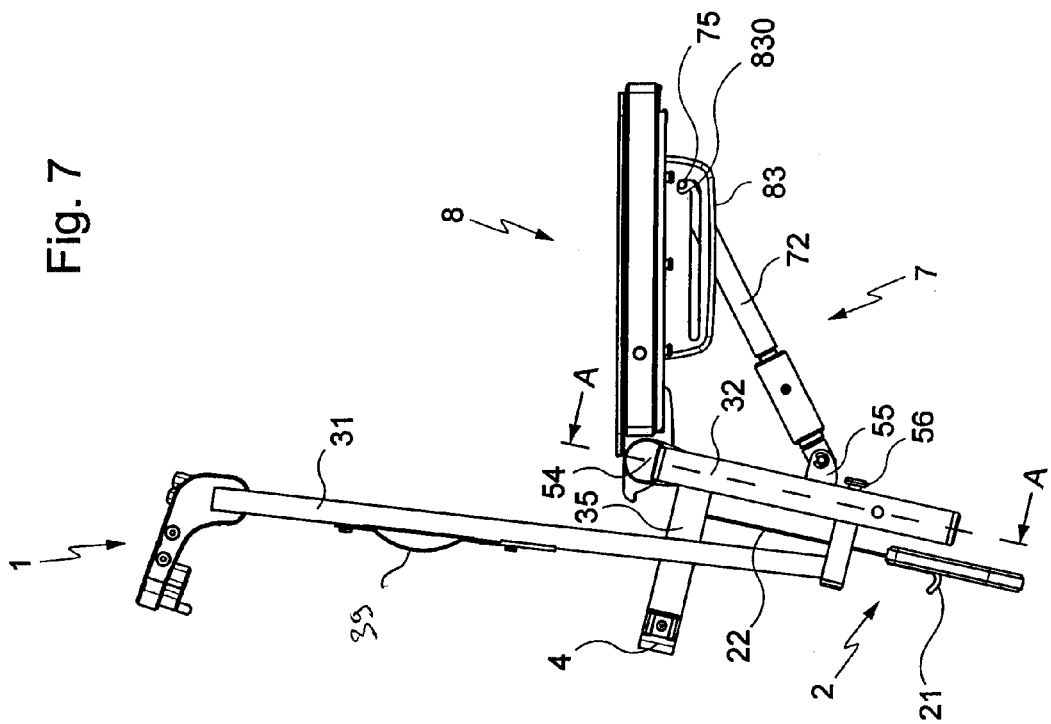
Figure 6:
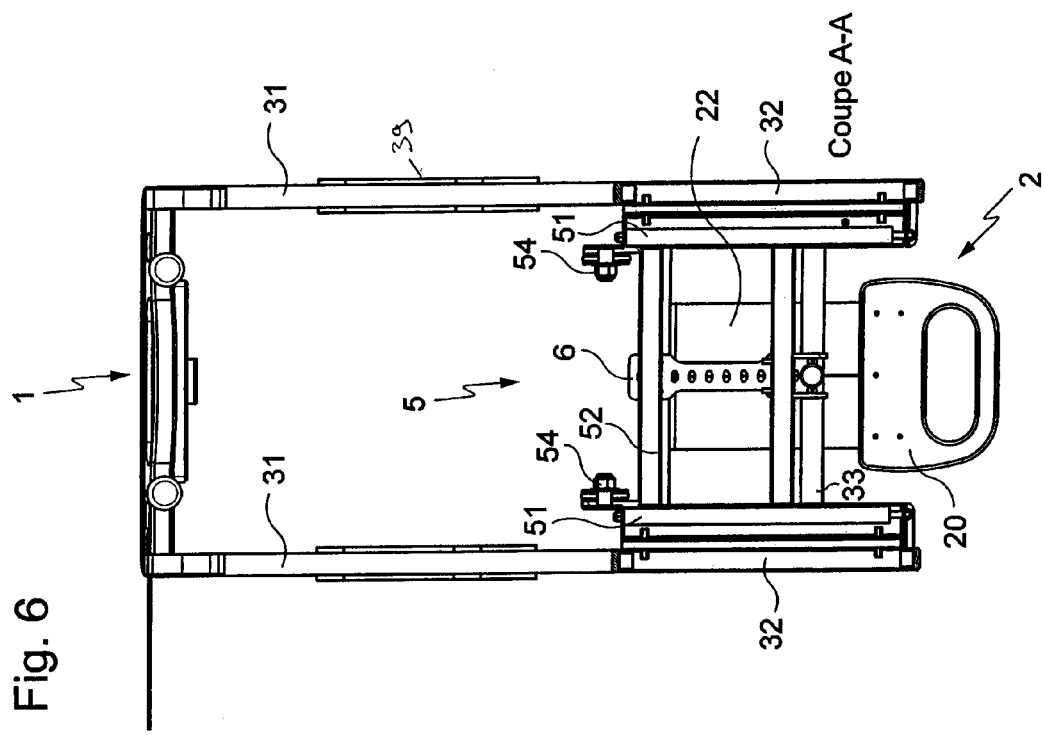
Figure 8:
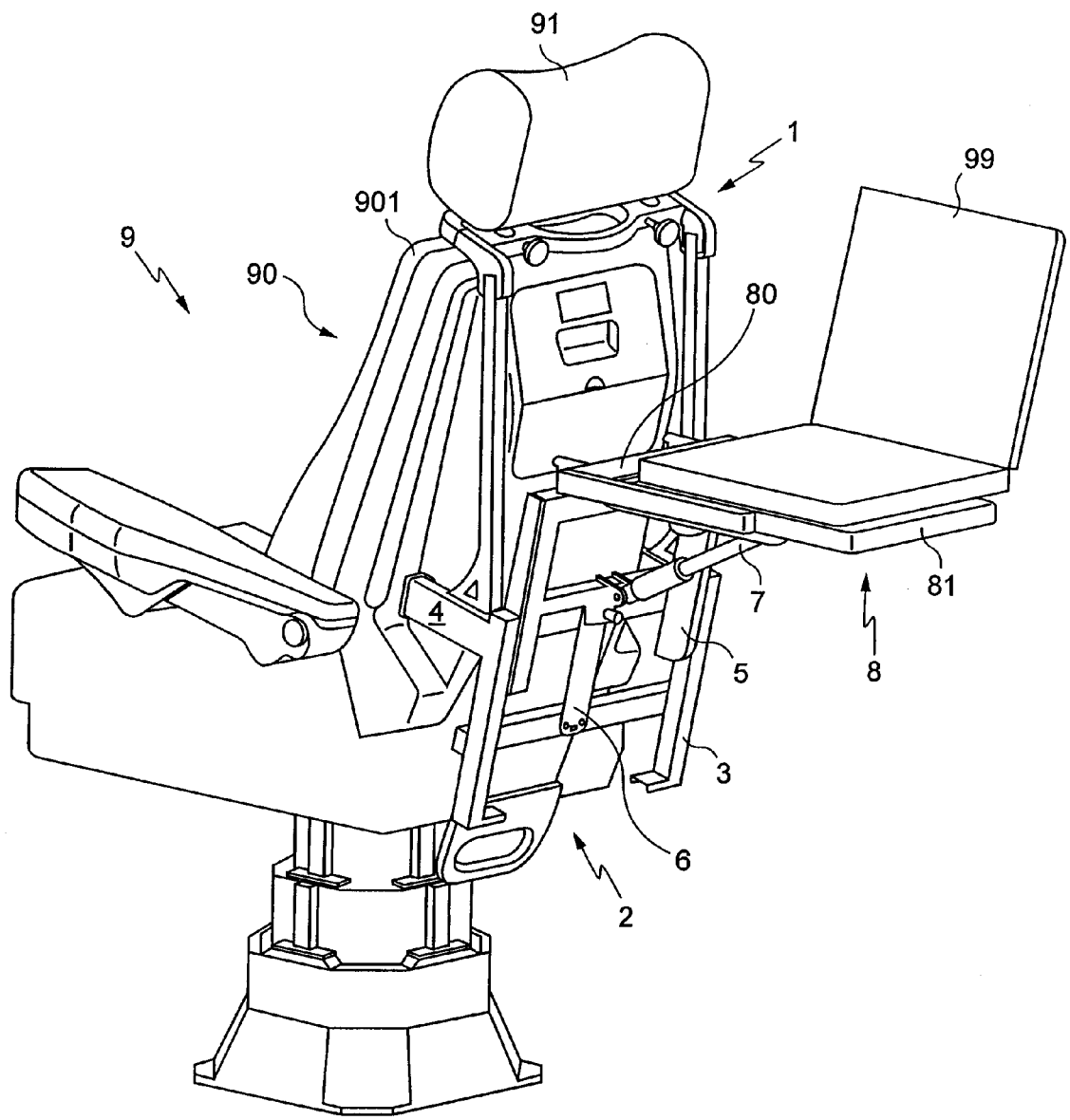
Figure 9:
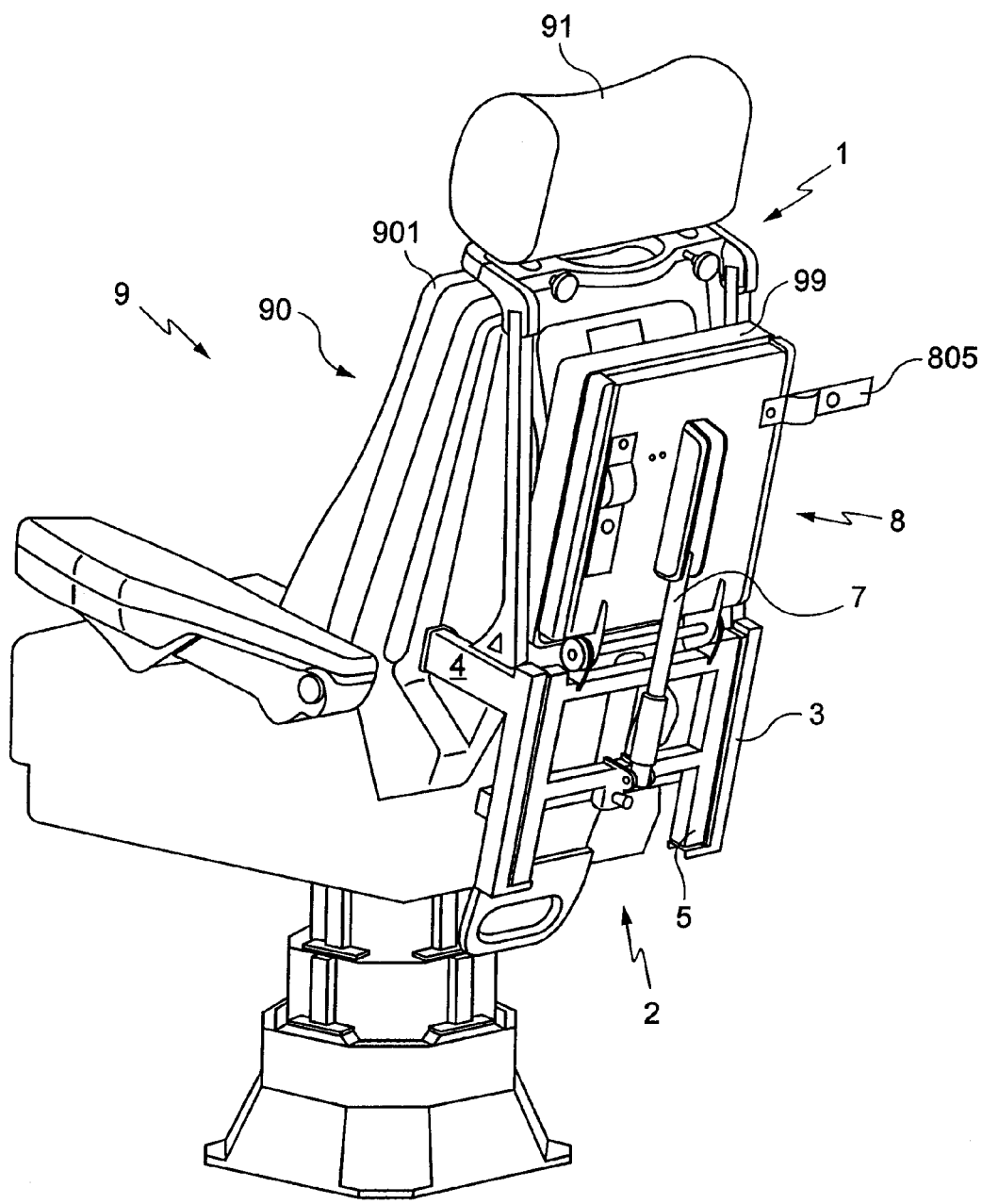

Other characteristics and advantages of the invention will emerge in the light of the detailed description below and the drawings in which:

FIGS. 1 and 2 are views from two different angles of an embodiment of a support device bearing a shelf according to the invention FIG. 3 is an exploded view of an embodiment of a clamp system for a support device according to the invention FIG. 4 is a view of the rod of an embodiment of a support device according to the invention FIG. 5 is an exploded view of the shelf of a device according to an embodiment of the invention FIG. 6 is a side view of an embodiment of a support device bearing a shelf according to the invention FIG. 7 is a front view in cross section of an embodiment of a support device bearing a shelf according to the invention FIGS. 8 and 9 depict an airplane pilot's seat equipped with a support device bearing a shelf according to an embodiment of the invention in two configurations of the shelf.

It will be noted that FIGS. 8 and 9 present an embodiment slightly different from the embodiment of FIGS. 1 to 7, clearly showing that the invention is not limited to only the embodiments presented in detail.

In reference to FIGS. 1 and 2, a support device for a shelf according to one embodiment of the invention comprises a clamp system 1 for fastening to the uprights of the headrest of a seat, a fastening system 2 for the support device at the bottom of the seat back, a framework which is, in the embodiment depicted, a metal mechanical support frame 3, a protective stop 4 making it possible to position the support device supported on the back of the seat, a lifter 5 (or frame-lift), an indexing rack 6, and a rod 7 for seat adjustment.

The support device according to the embodiment depicted is in particular suitable for holding a sliding tray system 8, but with simple modifications it easily could be adapted for holding a different system.

In reference to FIG. 3, the clamp system 1 for fastening to the headrest comprises in particular a clamp support 10, a clamp 11 and a base for anchoring 14.

The clamp support 10 is a flat, elongated part comprising two faces. It also comprises, on one of its sides, a straight lateral section parallel to its direction of elongation. This straight lateral section bears a centering lug 101 extending beyond the middle of the length, intended to serve as a failsafe mechanism.

The clamp support 10 also comprises two identical slots 103 traversing it perpendicular to its plane over its entire thickness and emerging through the two faces. These slots 103 are positioned so that they also emerge through the straight lateral section of the clamp support 10, so that their section is a semicircle.

The clamp support 10 further comprises a built-in handle 102.

The clamp 11 also is flat and elongated and comprises two faces. It further comprises, on one of its sides, a straight section parallel to its direction of elongation. This straight section comprises a centering notch 111 complementary to the centering lug 101.

The clamp 11 also comprises two identical slots 112 traversing it perpendicular to its plane over its entire thickness and emerging through the two faces. These slots 112 are positioned so that they also emerge through the straight section of the clamp, so that their section is a semicircle.

The clamp 11 can be centered on the clamp support by positioning of the two straight sections in contact with one another so as to cause the centering lug 101 and the centering notch 111 to cooperate.

When the clamp 11 is centered in this manner on the clamp support 10, each slot 103 is opposite a slot 112. The coming together of a slot 103 and a slot 112 forms a slot with a closed cylindrical contour, the section of which is a circle made up of the two previously mentioned semicircles.

The clamp system 1 moreover comprises two captive screw, eyelet and cage nut assemblies 12, allowing the fastening of the clamp 11 on the clamp support 10 by a knurled-nut system. The cage nuts are mounted forcibly on the clamp 10 with a strong gluing. The captive screws necessitate a Samaro FX25 gluing.

The clamp system 1 also comprises a flexible cable 13 connecting the clamp 11 to the clamp support 10 in a flexible and practical manner and thus preventing the clamp 11 from being mislaid when the latter is not fastened to the clamp support 10.

The clamp system 1 also comprises a base for anchoring 14 on the seat. This base for anchoring 14 is fastened integral with the clamp support 10, on the face of the clamp support intended to be positioned on the seat side. It comprises a projecting portion 140 intended to anchor the clamp system 1 in the seat cushion during the phase of installation of the device, prior to fastening of the clamp 11 which is accomplished with the aid of the captive screw, eyelet and cage nut assemblies 12.

At this stage it is noted that the clamp support 10 and the base for anchoring 14 are meant to be integral with the rest of the shelf support device, while the clamp 11 is movable in order to permit fastening or dismantling of the shelf support device.

The two slots 103 and 112 substantially serve for fastening onto the uprights of the headrest of the seat, as will be seen in reference to FIGS. 8 and 9. As for the handle 102, it is used to facilitate transport of the shelf support device and handling thereof during mounting or dismantling.

The device comprises a metal support frame 3 comprising two straight vertical frame components 31 parallel to one another, of the same length and with rectangular section.

A strap 39 is present on each upright 31 on the side of the upright intended to face the back of the seat back. These two straps are elastic straps with tension limiter making it possible to keep the tray in vertical position during transport by an operator, and also to save space in case of non-use. They are positioned at the same distance from the clamp support 10.

The frame 3 further comprises two outer slide components 32, rectangular, vertical, parallel to one another, of the same length and symmetrical in relation to a plane. Each outer slide component 32 extends a vertical frame component 31 by forming with the direction of the latter an angle of a few degrees (between 10° and 30°, according to the embodiment chosen).

The frame 3 further comprises a first horizontal frame component 33 (toward the bottom on FIG. 6) and a second horizontal frame component 34 (above the first frame component on FIG. 6) connecting the two outer slide components 32, perpendicular to the latter.

The first horizontal frame component 33 connects the two vertical frame components 31 at their first ends, the lower ends on FIG. 6. The first horizontal frame component 33 also connects the two outer slide components 32 at a level approximately at one quarter of its length starting from its first end, the lower end on FIG. 6.

The second horizontal frame component 34 connects the two outer slide components at their second ends, the upper ends on FIG. 6.

The frame further comprises two reinforcement sections 35. Each reinforcement section 35 connects an outer slide component 32 at its second end to a vertical frame component 31 at a level approximately at one quarter of its length starting from its first end.

The frame 3 further possesses two protective stops 4. Each protective stop 4 is positioned projecting on a vertical frame component 31, in the extension of a reinforcement section 35, on the opposite side from the outer slide component 32.

In reference to FIGS. 6 and 7, the fastening system 2 comprises a strap support 20 with a built-in handle and a hook 21 extended over the entire width of the support, as well as an elastic strap 22. It is noted here and now that the built-in handle and the hook 21 are intended to keep the shelf support device in tension between the headrest and the angle of the bottom of the back of the seat on which the device is intended to be mounted.

In reference to FIGS. 6 and 7, the metal lifter 5 comprises two straight inner slide components 51, parallel and back to back in relation to one another, as well as a first crosspiece 52 (the upper crosspiece on FIG. 6) and a second crosspiece 53 (the lower crosspiece on FIG. 6) connecting the two inner slide components 51.

The lifter 5 also comprises connections 54 for the axis of rotation of the tray with two jacks positioned in the upper portion of the inner slide components 51.

The lifter 5 also comprises a connection for rod 55 on the inner crosspiece 53 at the middle of its length. It also comprises an indexing finger 56 fastened on the lower crosspiece 53 at the middle of its length on the side opposite from the upper crosspiece 52. This indexing finger is intended to cooperate with the rack 6.

The rack 6 is an elongated part fastened to the horizontal frame components 33 and 34 parallel to the outer slide components 32. It is made up of notches cooperating with the indexing finger 56 in a manner known to the individual skilled in the trade.

The rod 7 comprises two screwed (or threaded) axles 71, 72 cooperating by means of a knurled nut 73 in a manner known to the individual skilled in the trade, as well as two fastening pins 74, 75 at the free ends of the axles 71, 72 respectively. Action on the rod 7 makes it possible to adjust the length thereof between the two fastening pins 74, 75.

The support frame 3 constitutes a main structure on which the various components of the device are fastened, thus forming a framework.

Each of the two ends of the clamp support 10 is fastened to the second end (the upper end on the Figures) of a vertical frame component 31. The direction of extension of the clamp support 10 is therefore parallel to the horizontal frame components 33, 34.

The elastic strap 22 is fastened to the middle of the horizontal frame component 34, on the side opposite the outer slide components 32, by way of its end opposite the handle 20. The elastic strap 22 extends parallel to the slide components 32.

The lifter 5 is positioned in the space between the two outer slide components 32, each inner slide component 51 cooperating with an outer slide component 32, the lifter 5 therefore being movable in translation in relation to the frame 3 parallel to the outer slide components 32 between a first position, referred to as lower position (depicted on FIGS. 1, 2, 5, 6 and 7) and a second position, referred to as higher position (depicted on FIG. 8).

The indexing finger 56 cooperating with the rack 6 makes it possible to immobilize the lifter 5 between these two positions, thus allowing an adjustment in height.

The rod 7 is fastened by way of the fastening pin 74 to the connection for rod 55, forming a pivot connection allowing a rotational movement of the rod 7 in relation to the lifter 5.

In reference to FIG. 5, the sliding tray system 8 indexed in rotation and translation comprises a tray support 80 composed of a rectangular bottom and three edges perpendicular to this bottom extending from a single side of this bottom (upward on FIG. 5).

The tray support 80 is equipped with two cheeks 801 extended on the inside of the two edges facing one another by two slides 802 suitable for cooperating with the cheeks 801, and an indexed translation system 803 being positioned parallel to the two cheeks 801 halfway between the latter. The tray support 80 also comprises two connections 804 for the axis of rotation of the tray.

The tray system 8 further comprises a flat rectangular sliding tray 81 suitable for being mounted on the cheeks 801 and the slides 802 parallel to the bottom of the tray support 8 inside the edges thereof. The sliding tray 81 is equipped with a protective strip 811 on one of its edges, suitable for being positioned opposite the side of the tray support 80 without an edge.

It follows therefrom that the sliding tray 81 is movable in translation in relation to the tray support 80, along a direction parallel to the two edges of the tray support 80 facing one another, between a position referred to as retracted (depicted in FIGS. 1, 2, 6, 7 and 9) and a position referred to as extended (depicted in FIG. 8).

The tray system 8 further comprises a flat rectangular shelf 82 fastened to the sliding tray 81 by way of an axle 821 perpendicular to the plane of the sliding tray 81 which allows rotation thereof, indexed in relation to the sliding tray 81 by way of an index system 822 and braked in relation to the sliding tray 81 by way of a brake system 823. It is noted that according to one embodiment, the shelf 82 is thinner and lighter than the sliding tray 81.

Finally, the tray system 8 comprises a rod guide rail 83 extended along a rail direction, and comprising a flat fixation face parallel to the rail direction.

The rod guide rail 83 is fastened by way of its fastening face on the face of the tray support 80 opposite the edges thereof (the underside of the tray support), parallel to the cheeks 801, and therefore parallel to the direction of translation of the sliding tray 81.

The guide rail 83 comprises a slot extended along the rail direction and running right through it along a direction perpendicular to the rail direction and parallel to the fastening face. This slot moreover comprises a locking position at its end along the rail direction farthest from the lifter 5.

This locking position is achieved by the presence of a locking lug 830 making it possible to prevent lift-up of the tray system in case of violent jolting (downward accelerations).

The tray support 80 is fastened to the lifter 5 by way of connections 804 at the connections 54 for the axis of rotation of the tray borne by the lifter 5 and mentioned previously. The tray support 80 therefore is in rotation in relation to the lifter 5 around this axis which is parallel to the crosspieces 52 and 53 and perpendicular to the direction of translation of the sliding tray 81.

It will be noted that this axis is braked in order to cushion the fall of the tray support 80 loaded with a 3-kg mass at its center during its opening-out. Adjustment of the brakes is accomplished by tightening of nuts at the connections 54.

The fastening pin 75 is positioned in the extended slot of the rod guide rail 83, so that the rod 7 is movable in relation to the tray support 80 in translation along the direction of the rail, but also in rotation around an axis perpendicular to the direction of the rail parallel to the plane of the bottom of the tray support 80.

In the position depicted in FIGS. 1, 2, 7 and 8, the fastening pin 75 is positioned in the locking position 830 of the guide rail 83. The rod 7 then forms an angle that may be 45° with the inner slide components 51. The rod 7 also forms an angle that may be 45° with the guide rail of the rod guide rail 83 and the direction of translation of the tray 81. It will be noted that these angles also may deviate considerably from 45°. The tray system 8 then is in an opened-out position. It will be noted that the jacks 54 allow compensation for the mass of the tray and for the load placed on the tray, typically a portable computer.

Conversely, in the position depicted in FIG. 9, the tray system is in a folded-back position, the fastening pin 75 being positioned in the slot of the guide rail 83 on the opposite side from the locking position 830. The rod is approximately parallel to the inner slide components 51 and to the plane of the bottom of the tray support 80. The tray support 80 is located approximately in the extension of the lifter 5.

In reference to FIGS. 8 and 9, an airplane pilot's (or copilot's) seat 9 comprises a back 90 at the top of which there is positioned a headrest 91 mounted on two uprights (not depicted), in a manner known to the individual skilled in the trade. The back 90 can be tilted for the comfort of the pilot. The front face of the back 90 is composed of a cushion 901.

The support device according to the invention is depicted in mounted arrangement on the back of the back 90. The projecting portion 140 is slightly embedded in the cushion 901. The clamp 11 and the clamp support 10 grip the uprights of the headrest 91 at their slots 103 and 112.

The hook 21 of the strap system is hooked on the angle of the bottom of the back 90, holding the elastic strap 22 in tension, and holding the support device against the back 90.

The protective stops 4 are supported against the back 90. The angle between the vertical frame components 31 and the outer slide components 32 allows the support device according to the invention to adapt to the form of the pilot's seat.

The lifter 5 is in translation along a direction barely inclined in relation to the vertical (for example by less than 10, 20 or 30°), which depends on the tilt of the back 90.

On the view of FIG. 8, an open portable computer 99 is placed on the shelf 82, or in one embodiment, directly on the sliding tray 81. According to the tilt of the back 90 of the pilot's seat, the base of the tray support 80 is adjusted by modifying the length of the rod 7, by action in particular on the knurled nut 73, so as to maintain the horizontality of the sliding tray 81.

According to the tilt of the back and the adjustment of the rod 7, the sliding tray is in translation along a direction close to the horizontal.

It will be noted that the user (not depicted) is positioned behind the pilot's seat, but at an angle in relation thereto (contrary to the arrangement of the passenger cabins). The freedom of rotation of the shelf 82 allows him to position the screen of the portable computer 99 as he wishes for ease of use.

In the view of FIG. 9, the portable computer 99 is closed and is positioned between the back 90 and the sliding tray 81.

It will be noted that in a preferred embodiment, two elastic tray-storage straps 805 with tension limiter are fastened on the lower surface of the tray support 80. They make it possible, for example, to keep the tray in vertical position during transport by an operator or in case of downward acceleration of the aircraft (negative g).

It will be noted that this invention is not limited to the form of implementation described above and depicted in the drawing. It also relates to all the variant implementations within the capacity of the individual skilled in the trade.

The invention claimed is:

1. A support device configured to be mounted against the rear of a back of a seat comprising a headrest, the headrest being held at the top of the back by at least one upright, the support device comprising:
    a framework configured to be positioned and supported on the top of the back, the framework including an elongated clamp support having two faces;
    a clamp movable in relation to the framework and configured to grip the upright in cooperation with the clamp support; and
    at least one reversible fastener configured to fasten the clamp to the framework so as to immobilize the framework in relation to the upright, wherein
    the framework further includes a projection portion on one face of the clamp support, the projection portion configured to anchor the framework in a cushion of a front face of the top of the back in a location positioned apart from a location of the at least one upright.

2. The support device according to claim 1, wherein the clamp is connected to the framework by a flexible cable.

3. The support device according to claim 1, further comprising a fastening system configured to hook the framework on a bottom of the seat, the fastening system comprising an elastic strap connecting the framework to a hook suitable for hooking the bottom of the seat.

4. The support device according to claim 1, further comprising a lifter in translation in relation to the framework along a direction barely inclined in relation to a vertical plane of the mounted arrangement of the support device.

5. The support device according to claim 1, further comprising a tray system capable of being positioned at least in an opened-out position to serve as a support surface, the tray system being movable in rotation, in relation to a support for the tray system, around an axis of rotation of the horizontal tray system in the mounted arrangement of the support device, between at least the opened-out position and a position folded back against the back on the headrest side.

6. The support device according to claim 5, wherein
    an angle between the tray system and the support device in the opened-out position can be adjusted by a user by way of action on a rod of adjustable length, and
    two axes of articulation of the rod being parallel to the axis of rotation of the tray system, the rod being connected at a first end to a support for the tray system and at a second end to the tray system.

7. The support device according to claim 5, wherein the tray system comprises a sliding tray which, in the mounted arrangement of the support device and in the opened-out position of the tray system, is movable in translation in relation to a support for the tray system along a more or less horizontal direction.

8. An aircraft sub-assembly equipped with a support device according to claim 1.

9. A method for installation of a support device against the rear of a back of a seat comprising a headrest held at the top of the back by at least one upright, in a "mounted arrangement", the method comprising:
    a first stage during which a suitable framework of the device is positioned and supported on the top of the back, the first stage including anchoring the framework in a cushion of a front face of the top of the back through a projection portion of the framework in a location positioned apart from a location of the at least one upright; and
    at the end of the first stage, a second stage during which at least one reversible fastener is configured to fasten, to the framework positioned and supported on the top of the back, a clamp movable in relation to the framework so as to immobilize the framework in relation to the upright.

* * * * *